Patented Oct. 15, 1946

2,409,444

UNITED STATES PATENT OFFICE 2,409,444

CLOCK LUBRICANT

John D. Morgan, South Orange, and Russell E. Lowe, East Orange, N. J., assignors to Cities Service Oil Company, New York, N. Y., a corporation of Pennsylvania No Drawing. Application August 14, 1944, Serial No. 549,494

2 Claims. (Cl. 252—49.8)

This invention relates to lubricants and more particularly to compositions for lubricating electric clocks, chronometers and similar precision timing devices.

The small synchronous electric motors, and associated gear trains, which constitute the timing units of most electric clocks and similar chronographic devices, raise lubrication problems which are not answered by any of the normal time piece oils, nor even by many of the special oils which are prepared for this specific work. As a general rule the bearings and other moving parts of these motor units are lubricated but once, at the time of manufacture, and the lubricant must last for the full life of the device. It is accordingly essential that the lubricant shall be chemically stable to a high degree, resisting oxidation and polymerization, both of which chemical reactions tend to change the viscosity and lubricating values. A further requirement is that the lubricant must have an extremely low volatility so that it will not evaporate during the life of the timing mechanism and leaving the bearings and other parts dry. Obviously in service of this kind it is very important that the lubricant shall not attack the bearings, pivots, and gears, and that it should tend to protect those parts from corrosion by the water vapor, and oxygen of the atmosphere. In addition to all of the foregoing, it is essential that the lubricant shall not react with or dissolve the painted and lacquered dials and other parts of a clock mechanism which action would tend to destroy the utility of both the device and the oil itself.

The principal object of the invention is to provide a lubricating oil which is chemically stable over extended periods of time, has a relatively low viscosity over a wide range of temperatures, which is non-corrosive to metals used in the construction of electric clocks, and has no solvent or chemical effect upon the paints and lacquers normally used in such devices.

It is a further object of the invention to provide a time piece lubricant which is better adapted to meet lubrication requirements of synchronous electric clocks than any of the lubricants now available for this purpose, and which may be manufactured at a comparatively low cost from synthetically prepared ingredients that are readily available in the domestic market.

We have discovered that very satisfactory lubricants can be prepared from mixtures of tricresyl phosphate; di butyl phthalate; and tri ethylene glycol di-2-ethyl butyrate. These ingredients are all prepared synthetically in this country and are readily available on the open market. The production of our lubricant does not depend, therefore, upon the availability of ingredients which must be imported from abroad, as do many timepiece and other special oils, and the product can be made and sold at a comparatively low cost.

One specific example of a lubricant which is particularly well suited to the lubrication of electric clocks and similar devices has the following formula:

| | Percent by weight |
|---|---|
| Tricresyl phosphate | 50 |
| Di butyl phthalate | 20 |
| Tri ethylene glycol di-2-ethyl butyrate | 30 |

The resulting oil-like product has a kinematic viscosity of 13.49 centistokes at 100° F., a value which is recognized as substantial at this high temperature and as being entirely adequate for the lubrication of electric clock bearings. When the temperature of the liquid is dropped to −10° F., its viscosity increases to a value of only 380.4 centistokes, which for this temperature is fairly low. Both the pour point and the cloud point of the liquid are at some temperature below −60° F., thus indicating that the composition does not begin to separate into its components nor to freeze at any temperature at which electric clocks can be expected to operate. It will be evident from the foregoing that the viscosities of our fluid may be said to be low, that they remain relatively constant over a wide range of temperature, and that these properties are well within the viscosity-temperature specifications laid down by the leading manufacturers of electric clock mechanisms for lubricants for their timing mechanisms.

The volatility of the composition is extremely low. Upon test in an open cup, a sample of our fluid showed a loss of only four tenths of one percent after being held at a temperature of 160° F. for 500 hours.

The chemical stability of the fluid is excellent. It is, of course, free of gum when first prepared, and long exposure at high temperature does not seem to produce any undesirable residues. A thin film of the liquid was held at a temperature of 160° F., for example, for some 300 hours, after which it showed no tack development or other indication of deterioration. At more moderate temperatures of the order of normal room temperatures, there is no evidence of oxidation and gumming, even after very extended periods of exposure.

A further feature of the advantage of this lubricant is its very low spread factor. Thus, the liquid tends to stay in the place in which it is put and not to creep away to surrounding surfaces. We have found, for example, that the lubricant does not tend to spread away from the main shaft of the timing unit to the dial of an electric clock, nor to creep around the edge of the case, etc.

The solvent action of the lubricant upon lithographic paints and lacquers was tested by immersing lithographed clock dials in the lubricant for extended periods of time and at temperatures well in excess of normal summer heat. At the conclusion of these tests the dials showed no ill effects. The lubricant exhibited no tendency to remove the lithographic paint, or to soften it in the least.

The fluid has no corrosive action upon steel, copper, and brass or other metals normally used in clock manufacture. In fact its presence on pivots, bearings, etc., serves to prevent rusting and atmospheric corrosion.

The foregoing composition is an ideal lubricant for lubricating electric clocks and the like, because of its unique properties that particularly suit it for that type of service. We have found, however, that other desirable lubricants may be prepared from mixtures of these same ingredients within the following range: tricresyl phosphate 40 to 60 percent; di butyl phthalate 25 to 15 percent; tri ethylene glycol di-2- etc. 35–25 percent, the percentages being by weight. All of these compositions have good lubricating properties, are stable and resist gum-forming tendencies for long periods of time, and have little or no action upon lithographic paints. The percentages of the individual ingredients may be adjusted to bring out one or another of these properties for the purpose of meeting the special requirements of individual problems.

Having described our invention what we claim is:

1. A lubricant consisting essentially of a mixture of from 40 to 60 percent of tricresyl phosphate, from 25 to 15 percent of di butyl phthalate, and from 35 to 25 percent of triethylene glycol di-2-ethylbutyrate, all of said percentages being by weight.

2. A lubricant for electric clocks and the like consisting of about 50 percent by weight of tricresyl phosphate, about 20 percent by weight of di butyl phthalate, and about 30 percent by weight of triethylene glycol di-2-ethylbutyrate.

JOHN D. MORGAN.
RUSSELL E. LOWE.